UNITED STATES PATENT OFFICE 1,995,747

PREPARATION OF REVERSIBLE RUBBER COMPOSITIONS FROM RUBBER LATEX AND THEIR REVERSAL

Royce J. Noble, Malden, Mass., assignor to Heveatex Corporation, Melrose, Mass., a corporation of Massachusetts No Drawing. Application May 12, 1934, Serial No. 725,344

20 Claims. (Cl. 18—50)

This invention relates to the preparation of reversible rubber compositions from rubber latex and their reversal to rubber latex. It relates more particularly to the flocculation of rubber latex to produce reversible rubber flocs which, after they have been dewatered to a comparatively low moisture content, are caused to revert to rubber latex. When I say that reversion to rubber latex is effected, I mean that a colloidal suspension of rubber partaking of the characteristics of the original latex is regenerated from the rubber flocs. While not limited thereto, the practice of the present invention is particularly advantageous when rubber latex is to be shipped long distances, as in such case, the rubber latex may, in accordance with my invention, be transformed at the place of its shipment into a reversible, semi-solid mass of comparatively low moisture content and then be reversed at the place of its destination, for instance, in the factory, into a rubber latex of the desired solids content. The compositions of the present invention present advantages over liquid concentrated latices of the nature of so-called centrifuged latices or creamed latices in that such compositions are of lower water content and, being of a semi-solid or stiff pastelike consistency, need not be shipped in the comparatively expensive drums or other containers that are necessary to prevent the leakage and drying of such latices.

In accordance with the present invention, a water-soluble stabilizer is added to the original rubber latex so as to envelop the ultimate rubber particles of the latex with such stabilizer, whereupon the latex is flocculated with a chemical that insolubilizes the stabilizer, enveloping the ultimate rubber particles of which the rubber flocs are constituted. The rubber flocs are then dewatered to a stage where they are loosely bonded together or cohere as a moist continuous semi-solid mass having a consistency similar to that of cottage cheese. It is this moist semi-solid mass that constitutes the reversible rubber composition of the present invention, for it reverts to latex by the mere addition thereto of water and a chemical that solubilizes and leaches out the insolubilized stabilizer from the rubber flocs and thereby liberates the ultimate rubber particles in the water. It is preferable that the dewatering of the rubber flocs be arrested at a stage where they contain at least about 20% to 30% of water, since it is only at such moisture content that the resulting semi-solid mass can be reversed at the desired rate of speed to latex by the mere addition thereof of water and a chemical that solubilizes the insolubilized stabilizer surrounding the ultimate rubber particles. The reversion of the semi-solid mass to latex may be accelerated by first rendering it discontinuous as by a shearing, shredding, tearing, or similar comminuting action. Such comminution or sub-division of the mass may be readily effected to produce particles of a size finer than about 30 mesh which are wetted quickly throughout by the water and the chemical that solubilizes the insolubilized stabilizer and are, accordingly, quickly reversed to latex.

The stabilizers added to the latex may be the soluble caseinates, albuminates, etc.; and the flocculating agents are preferably salts of those heavy metals, like zinc, that are not only capable of undergoing metathetical reaction with such stabilizers to form insoluble compounds, viz., heavy metal caseinates, albuminates, etc., but are capable of forming complex radicals with ammonia. This means that the moist semi-solid composition into which the rubber flocs are converted by the dewatering operation can be reversed to latex by mere treatment with ammonia water, as the ammonia solubilizes such heavy metal caseinates, albuminates, etc., by forming an ammonia complex with the heavy metal, e. g., a zinc-ammonia complex, and thereby promotes a dispersion of the ultimate rubber particles in the aqueous medium.

A specific example of procedure falling within the purview of the present invention may be carried out substantially as follows. To about 1,000 pounds of ammonia-preserved latex of about 40% solids content is added, with stirring, about 300 pounds of a 10% caseinate solution. The caseinate solution may be prepared by swelling dry casein in water, adding sufficient ammonia water to form ammonium caseinate, stirring until free from lumps, and diluting to 10% strength. The latex-caseinate mixture is preferably diluted to about 20% solids content so as to avoid tendency toward the formation of large rubber flocs when a suitable flocculating agent is added thereto. To the diluted latex-caseinate mixture is then gradually added, with stirring, about 2,000 pounds of a 1% solution of zinc chloride in water preferably containing a trace of acetic acid. This amount of zinc chloride ensures complete flocculation of the latex, the zinc chloride not only functioning as a flocculating agent but also as an insolubilizer of the stabilizer with which it undergoes a metathetical reaction to form the insoluble zinc caseinate. The insolubilized stabilizer envelops the ultimate rubber particles of the latex, which aggregate and coalesce into flocs as the stabilizer surrounding them is being insolubilized. The slurry of rubber flocs thus produced is then dewatered, as in a filter press or centrifugal filter, until a cake or semi-solid mass of about 70% solids content is realized. The mass is of a consistency similar to that of cottage cheese and easily falls apart under rubbing or shearing action to yield pellets. It is not readily wetted by water but when treated with ammonia water it reverts to an aqueous rubber dispersion of the nature of the original latex.

The semi-solid mass resulting from the foregoing practice may be produced to best advantage at rubber plantations where latex is gathered and brought to a central depot. A large proportion of the water naturally occurring in the latex is removed in the production of such mass which, as such, may be transported to its destination. The mass should be protected during transportation and storage against undue loss of its moisture content, since otherwise it can be reversed to latex only with difficulty. To this end, it may be put up in suitable barrels or other containers that shield it against exposure to the atmosphere. If desired, the semi-solid mass, which is easily broken up, may be put through a suitable machine, such as an Abbe rotary cutter, designed to produce a comminuted product. The comminuted product must, of course, also be protected against drying out during shipment or storage. The comminuted product quickly reverts to latex upon being treated with ammonia water. In reversing the mass, the solids content of the resulting latex may be controlled by the amount of water employed in effecting the reversion.

The amount of stabilizer added to the latex preparatory to flocculation may vary, depending not only upon the characteristics of the original latex but upon the uses to which the regenerated latex is to be put. Ordinarily, about 2% to 10% of stabilizer, based on the solids content of the latex, should be used, the lower percentage being preferred for the reason that it does not appreciably affect the quality of the regenerated latex or the rubber compound eventually gained therefrom. The flocculation of the latex may be effected with various soluble salts such as those of zinc, aluminum, lead, magnesium, calcium, etc. Typical of such salts are zinc chloride, zinc acetate, aluminum sulphate, lead chloride, lead acetate, magnesium chloride, calcium chloride and calcium acetate. For the purpose of the present invention, a preferred salt is one that combines with the stabilizer added to the latex to produce a reaction product of maximum insolubility in water, as this leads to a flocculated rubber which has high physical or mechanical stability toward centrifugal, squeezing, or other mechanical dewatering treatments and from which sufficient water may be easily removed by such treatments to produce a semi-solid mass of comparatively low water content. Thus, for flocculating latex to which a soluble caseinate has been added as a stabilizer, zinc salts are superior to calcium salts. Acids or acid salts may be employed as flocculating agents provided that the latex is sufficiently diluted with water and is treated with a stabilizer that is insolubilized by the action of such acids or acid salts. These latter flocculating agents are, however, inferior to the heavy metal salts for the purpose of the present invention in that they lead to a semi-solid mass wherein the rubber flocs have stronger cohesiveness, as a result of which the mass is not reversed to latex as easily as when the heavy metal salts serve as flocculating agents.

Before the latex undergoes the various steps constituting the practice of the present invention, it may be compounded in known ways with rubber-compounding agents such as sulphur, zinc oxide, accelerators of vulcanization, anti-oxidants, pigments, dyes, etc. Accordingly, the expression "rubber latex", as used in the appended claims, is meant to include ordinary rubber latex or rubber latex that has been compounded in desired amount with the usual rubber-compounding agents. In some instances, it may be desired to compound the rubber composition of the present invention either as a continuous or discontinuous mass with the usual rubber-compounding agents and/or with fibrous and granular materials of all sorts. In such cases, compounding may be readily effected with the expenditure of comparatively little power, as the composition of the present invention, by virtue of the loose bond existing between the rubber flocs of which it is composed, offers little resistance against working the compounding agents thereinto and therethrough. Once combined and compounded with various agents, the composition may either be reversed to form an aqueous rubber dispersion containing the compounding agents suspended therein or be dried out to form a difficultly reversible rubber compound.

In some instances, it may be highly desirable to practice the process of the present invention as a whole at the plantation, including the final step of reversing the moist, semi-solid mass of rubber flocs to latex, in which case reversion of the mass would be effected with a comparatively small amount of concentrated ammonia water to produce a highly concentrated latex which would be shipped as such and, if desired, diluted with water at its place of destination to the desired solids content. Thus, assuming that the moist, semi-solid mass of rubber flocs has a water content of about 20 to 25%, its reversion may be effected with strong ammonia water to produce a concentrated latex having a solids content of as high as about 65% to 70%, at which solids content the latex is of a stiff pasty consistency. Such a stiff pasty latex can be shipped economically from the rubber plantation to all parts of the world. It should, of course, be protected in shipment against the evaporation of water. When so protected, it reaches the user of rubber latex in a condition such that the mere addition of plain water thereto results in its immediate dilution, which dilution may be effected to any desired final solids content, depending on the amount of diluting water added thereto. In those instances where users of rubber latex find it objectionable to reverse with ammonia water or other chemical reagent the reversible rubber compositions of the present invention, it is advantageous to resort at the rubber plantation to the final step of reversing such rubber compositions to concentrated latex which can be put to use as such or after mere dilution with plain water, as are ordinary concentrated latices, such as so-called creamed or centrifuged latices. However, when there is no objection on the part of users of rubber latex to effecting reversion of the rubber compositions of the present invention to latex, no such reversion is performed at the rubber plantation. In such latter case, maximum benefit is derived from the present invention, as the rubber compositions of the present invention can be shipped at lowest water content in the unreversed state.

So far as concerns subject-matter, this application is a continuation-in-part of my application Serial No. 706,858, filed January 16, 1934.

I claim:—

1. A process which comprises adding to rubber latex a water-soluble stabilizer capable of first being insolubilized and then being restored to a soluble state, fluocculating the latex with a chemical that insolubilizes said stabilizer, dewatering the rubber flocs only to a stage where they loosely cohere as a semi-solid mass, and adding to the moist mass water and a chemical that restores the insolubilized stabilizer to a soluble state, thereby causing such mass to revert to latex.

2. A process which comprises adding to rubber latex a water-soluble stabilizer capable of first being insolubilized and then being restored to a soluble state, flocculating the latex with a chemical that insolubilizes said stabilizer, dewatering the rubber flocs only to a stage where they loosely cohere as a semi-solid mass, comminuting the moist mass, and adding to the comminuted moist mass water and a chemical that restores the insolubilized stabilizer to a soluble state, thereby causing such mass to revert to latex.

3. A process which comprises adding to rubber latex a water-soluble stabilizer capable of first being insolubilized and then being restored to a soluble state, flocculating the latex with a chemical that insolubilizes said stabilizer, dewatering the rubber flocs only to a stage where they loosely cohere as a semi-solid mass containing at least about 20% to 30% of water, and adding to the moist mass water and a chemical that restores the insolubilized stabilizer to a soluble state, thereby causing such mass to revert to latex.

4. A process which comprises adding to rubber latex a water-soluble stabilizer capable of first being insolubilized and then being restored to a soluble state, flocculating the latex with a chemical that insolubilizes said stabilizer, dewatering the rubber flocs only to a stage where they loosely cohere as a semi-solid mass containing at least about 20% to 30% of water, comminuting the moist mass, and adding to the comminuted moist mass water and a chemical that restores the insolubilized stabilizer to a soluble state, thereby causing such mass to revert to latex.

5. A process which comprises adding to rubber latex a water-soluble stabilizer that can be insolubilized by the salt of a metal capable of combining with ammonia to form an ammonia complex, flocculating the latex with such salt so as to form an insolubilized stabilizer wherein such metal appears as a positive radical, dewatering the rubber flocs only to a stage where they loosely cohere as a semi-solid mass, and adding ammonia water to the moist mass to form said ammonia complex, thereby causing such mass to revert to latex.

6. A process which comprises adding to rubber latex a water-soluble stabilizer that can be insolubilized by the salt of a metal capable of combining with ammonia to form an ammonia complex, flocculating the latex with such salt so as to form an insolubilized stabilizer wherein such metal appears as a positive radical, dewatering the rubber flocs only to a stage where they loosely cohere as a semi-solid mass, comminuting the moist mass, and adding ammonia water to the moist comminuted mass to form said ammonia complex, thereby causing such mass to revert to latex.

7. A process which comprises adding to rubber latex a water-soluble stabilizer that can be insolubilized by the salt of a metal capable of combining with ammonia to form an ammonia complex, flocculating the latex with such salt so as to form an insolubilized stabilizer wherein such metal appears as a positive radical, dewatering the rubber flocs only to a stage where they loosely cohere as a semi-solid mass containing at least about 20% to 30% of water, and adding ammonia water to the moist mass to form said ammonia complex, thereby causing such mass to revert to latex.

8. A process which comprises adding to rubber latex a water-soluble stabilizer that can be insolubilized by the salt of a metal capable of combining with ammonia to form an ammonia complex, flocculating the latex with such salt so as to form an insolubilized stabilizer wherein such metal appears as a positive radical, dewatering the rubber flocs only to a stage where they loosely cohere as a semi-solid mass containing at least about 20% to 30% of water, comminuting the moist mass, and adding ammonia water to the comminuted moist mass to form said ammonia complex, thereby causing such mass to revert to latex.

9. A rubber composition consisting of flocculated rubber latex wherein the rubber flocs exist as a moist semi-solid mass, the ultimate rubber particles constituting said flocs being enveloped by an insolubilized latex-stabilizer, said composition reverting to latex by the mere addition thereto of water and a chemical that solubilizes and leaches out said insolubilized stabilizer from the rubber flocs and thereby liberates the ultimate rubber particles in the water.

10. A rubber composition consisting of flocculated rubber latex wherein the rubber flocs are loosely bonded together as a moist, continuous, semi-solid mass, the ultimate rubber particles constituting said flocs being enveloped by an insolubilized latex-stabilizer, said composition reverting to latex by the mere addition thereto of water and a chemical that solubilizes and leaches out said insolubilized stabilizer from the rubber flocs and thereby liberates the ultimate rubber particles in the water.

11. A rubber composition consisting of flocculated rubber latex wherein the rubber flocs exist as a moist, discontinuous, semi-solid mass, the ultimate rubber particles constituting said flocs being enveloped by an insolubilized latex-stabilizer, said composition reverting to latex by the mere addition thereto of water and a chemical that solubilizes and leaches out said insolubilized stabilizer from the rubber flocs and thereby liberates the ultimate rubber particles in the water.

12. A rubber composition consisting of flocculated rubber latex wherein the rubber flocs exist as a moist semi-solid mass, the ultimate rubber particles constituting said flocs being enveloped by an insolubilized latex-stabilizer capable of being solubilized by ammonia water, said composition reverting to latex by the mere addition thereto of ammonia water.

13. A composition consisting of flocculated rubber latex wherein the rubber flocs are loosely bonded together as a moist, continuous, semi-solid mass, the ultimate rubber particles constituting said flocs being enveloped by an insolubilized latex-stabilizer capable of being solubilized by ammonia water, said composition reverting to latex by the mere addition thereto of ammonia water.

14. A rubber composition consisting of flocculated rubber latex wherein the rubber flocs exist as a moist, discontinuous, semi-solid mass, the ultimate rubber particles constituting said flocs being enveloped by an insolubilized latex-stabilizer capable of being solubilized by ammonia water, said composition reverting to latex by the mere addition thereto of ammonia water.

15. A rubber composition consisting of flocculated rubber latex wherein the rubber flocs exist as a moist semi-solid mass, the ultimate rubber particles constituting said flocs being enveloped by an insolubilized latex-stabilizing compound whose positive radical is a metal capable of forming an ammonia complex, said composition reverting to latex by the mere addition thereto of ammonia water.

16. A rubber composition consisting of flocculated rubber latex wherein the rubber flocs are loosely bonded together as a moist, continuous, semi-solid mass, the ultimate rubber particles constituting said flocs being enveloped by an insolubilized latex-stabilizing compound whose positive radical is a metal capable of forming an ammonia complex, said composition reverting to latex by the mere addition of ammonia water.

17. A rubber composition consisting of flocculated rubber latex wherein the rubber flocs exist as a moist, discontinuous, semi-solid mass, the ultimate rubber particles constituting said flocs being enveloped by an insolubilized latex-stabilizing compound whose positive radical is a metal capable of forming an ammonia complex, said composition reverting to latex by the mere addition of ammonia water.

18. A rubber composition consisting of flocculated rubber latex wherein the rubber flocs exist as a moist semi-solid mass containing at least about 20% to 30% of water substantially uniformly distributed therethrough, the ultimate rubber particles constituting said flocs being enveloped by an insolubilized latex-stabilizer, said composition reverting to latex by the mere addition thereto of water and a chemical that solubilizes and leaches out said insolubilized stabilizer from the rubber flocs and thereby liberates the ultimate rubber particles in the water.

19. A rubber composition consisting of flocculated rubber latex wherein the rubber flocs are loosely bonded together as a moist, continuous, semi-solid mass containing at least about 20% to 30% of water substantially uniformly distributed therethrough, the ultimate rubber particles constituting said flocs being enveloped by an insolubilized latex-stabilizer, said composition reverting to latex by the mere addition thereto of water and a chemical that solubilizes and leaches out said insolubilized stabilizer from the rubber flocs and thereby liberates the ultimate rubber particles in the water.

20. A rubber composition consisting of flocculated rubber latex wherein the rubber flocs exist as a moist, discontinuous, semi-solid mass containing at least about 20% to 30% of water substantially uniformly distributed therethrough, the ultimate rubber particles constituting said flocs being enveloped by an insolubilized latex-stabilizer, said composition reverting to latex by the mere addition thereto of water and a chemical that solubilizes and leaches out said insolubilized stabilizer from the rubber flocs and thereby liberates the ultimate rubber particles in the water.

ROYCE J. NOBLE.